United States Patent
Schumacher et al.

(10) Patent No.: US 8,209,999 B2
(45) Date of Patent: Jul. 3, 2012

(54) METHOD OF MAKING SILICA-GLASS GRANULE FROM PYROGENIC SILICA POWDER

(75) Inventors: Kai Schumacher, Hofheim (DE); Christian Schulze-Isfort, Limeshain (DE); Paul Brandl, Shanghai (CN); Mitsuru Ochiai, Hasuda (JP)

(73) Assignee: Evonik Degussa GmbH, Essen (DE)

( * ) Notice: Subject to any disclaimer, the term of this patent is extended or adjusted under 35 U.S.C. 154(b) by 184 days.

(21) Appl. No.: 12/667,696

(22) PCT Filed: Jun. 4, 2008

(86) PCT No.: PCT/EP2008/056941
§ 371 (c)(1), (2), (4) Date: Jan. 5, 2010

(87) PCT Pub. No.: WO2009/007180
PCT Pub. Date: Jan. 15, 2009

(65) Prior Publication Data
US 2010/0178509 A1     Jul. 15, 2010

(30) Foreign Application Priority Data
Jul. 6, 2007  (EP) ................... 07111945

(51) Int. Cl.
 *C03B 19/06* (2006.01)
 *C03B 19/10* (2006.01)
 *C03C 3/04* (2006.01)
 *C03C 3/06* (2006.01)

(52) U.S. Cl. ............. 65/21.1; 65/17.3; 65/21.5; 501/33; 501/54

(58) Field of Classification Search ............ 428/402; 65/17.3, 21.1, 21.5; 501/33, 54
See application file for complete search history.

(56) References Cited

U.S. PATENT DOCUMENTS

| | | | |
|---|---|---|---|
| 3,738,785 A | 6/1973 | Reinhardt et al. | |
| 3,742,566 A | 7/1973 | Reinhardt et al. | |
| 3,762,851 A | 10/1973 | Reinhardt et al. | |
| 3,860,682 A | 1/1975 | Reinhardt et al. | |
| 4,042,361 A * | 8/1977 | Bihuniak et al. | 65/17.5 |
| 4,325,686 A | 4/1982 | Leon et al. | |
| 4,877,595 A | 10/1989 | Klingle et al. | |
| 5,063,179 A * | 11/1991 | Menashi et al. | 501/12 |

(Continued)

FOREIGN PATENT DOCUMENTS
DE   1 807 714   2/1971
(Continued)

*Primary Examiner* — Hoa (Holly) Le
(74) *Attorney, Agent, or Firm* — Oblon, Spivak, McClelland, Maier & Neustadt, L.L.P.

(57) ABSTRACT

Silica glass granule having the following features:

| | |
|---|---|
| Area: | 100 to 5000 $\mu m^2$, |
| ECD: | 5 to 100 $\mu m$, |
| Circumference: | 20 to 400 $\mu m$, |
| Maximum diameter: | 10 to 140 $\mu m$, |
| Minimum diameter: | 5 to 80 $\mu m$, |
| where all values are medium values, | |
| Specific BET surface area: | <1 $m^2/g$ |
| Impurities: | <50 ppm |

It is prepared by
a) compacting pyrogenic silicon dioxide powder with a tamped density of 15 to 190 g/l to slugs,
b) subsequently crushing them and removing slug fragments with a diameter of <100 $\mu m$ and >800 $\mu m$,
c) the slug fragments having a tamped density of 300 to 600 g/l, and
d) subsequently treating them at 600 to 1100° C. in an atmosphere which comprises one or more compounds which are suitable for removing hydroxyl groups, and
e) then sintering them at 1200° C. to 1400° C.

20 Claims, 1 Drawing Sheet

U.S. PATENT DOCUMENTS

| | | | |
|---|---|---|---|
| 5,643,347 A * | 7/1997 | Werdecker et al. | 65/21.1 |
| 6,047,568 A * | 4/2000 | Campion | 65/395 |
| 6,127,295 A * | 10/2000 | Yoon et al. | 501/12 |
| 6,296,826 B1 * | 10/2001 | Fujinoki et al. | 423/335 |
| 6,890,873 B2 * | 5/2005 | Oswald et al. | 501/54 |
| 7,534,409 B2 * | 5/2009 | Schumacher et al. | 423/335 |
| 7,541,014 B2 * | 6/2009 | Moerters et al. | 423/335 |
| 7,722,848 B2 * | 5/2010 | Dai et al. | 423/306 |
| 2005/0220692 A1 | 10/2005 | Mangold et al. | |
| 2006/0093543 A1 * | 5/2006 | Morters et al. | 423/335 |
| 2010/0183495 A1 * | 7/2010 | Schumacher et al. | 423/335 |

FOREIGN PATENT DOCUMENTS

| | | |
|---|---|---|
| DE | 37 41 846 | 1/1989 |
| EP | 0 335 875 | 8/1993 |
| EP | 1 074 513 | 2/2001 |
| EP | 1 717 202 | 11/2006 |
| EP | 1 813 574 | 8/2007 |
| JP | 2001 89168 | 4/2001 |
| WO | 2006 089754 | 8/2006 |

* cited by examiner

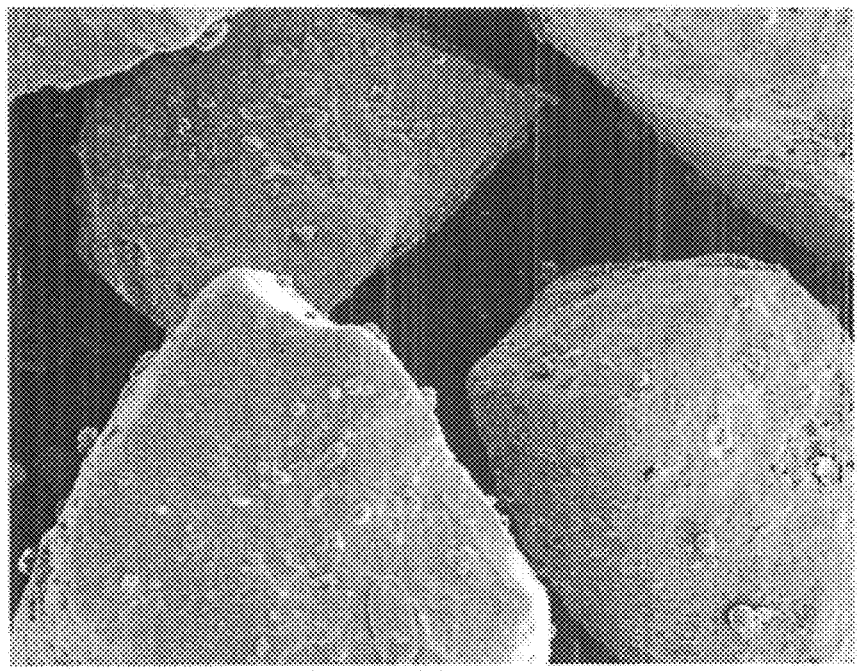
Figure 1A　　100 µm
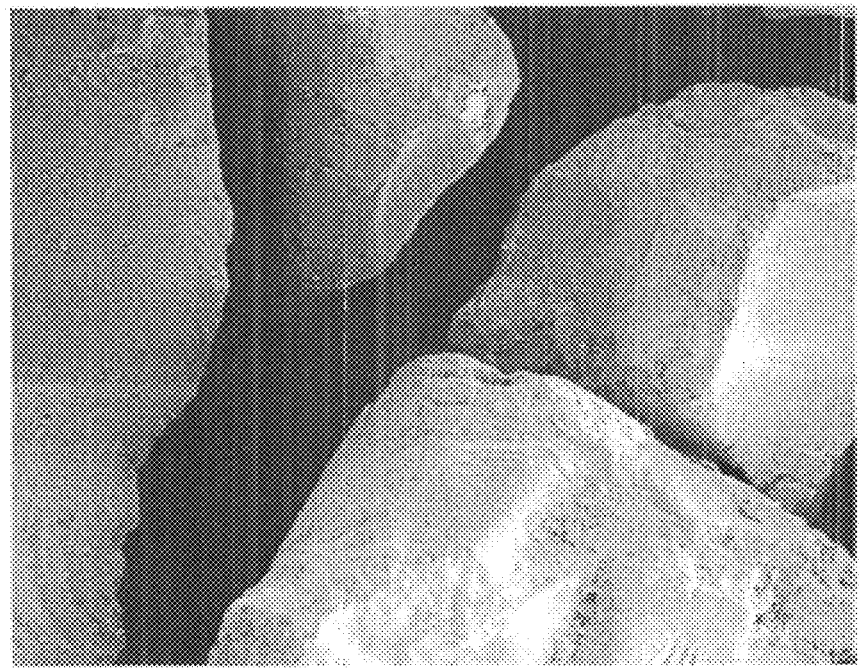
Figure 1B　　100 µm
PRIOR ART

METHOD OF MAKING SILICA-GLASS GRANULE FROM PYROGENIC SILICA POWDER

CROSS-REFERENCES TO RELATED APPLICATIONS

The present application is the national stage of international application PCT/EP2008/056941, filed on Jun. 4, 2008, published as WO 2009/007180 on Jan. 1, 2009, and claims priority to EP 07111945, filed on Jul. 6, 2007.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF THE MATERIAL ON THE COMPACT DISC

Not Applicable.

BACKGROUND OF THE INVENTION

Field of the Invention

The invention relates to a silica glass granule and to its preparation.

Numerous methods for preparing silica glass granules proceeding from amorphous silicon dioxide are known. Suitable starting materials may be silicon dioxide prepared by sol-gel processes, precipitated silica or a pyrogenic silicon dioxide. The preparation usually includes an agglomeration of the silicon dioxide. This can be done by means of wet granulation. In the wet granulation, a sol and, from this, with gradual removal of the moisture, a crumbly material are obtained from a colloidal silicon dioxide dispersion by constant mixing or stirring. The preparation by means of wet granulation is complicated and expensive, especially when high demands are made on a low contamination of the granule.

It is additionally possible to obtain silica glass by compacting silicon dioxide. The compacting, without binder, of pyrogenic silicon dioxide is difficult because pyrogenic silicon dioxide is very dry, and no capillary forces can bring about the particle binding. Pyrogenic silicon dioxides feature extreme fineness, a low bulk density, high surface area, very high purity, a very substantially spherical primary particle shape and the absence of pores. The pyrogenic silicon dioxide frequently has a high surface charge, which complicates the agglomeration in electrostatic terms.

The compaction of pyrogenic silicon dioxide has to date not been a useable route to the preparation of qualitatively high-value silica glass.

Description of the related art including information disclosed under 37 CFR 1.97 and 1.98

U.S. Pat. No. 4,042,361 discloses a process for preparing silica glass, in which pyrogenic silicon dioxide is used. This is incorporated into water to form a castable dispersion, then the water is removed thermally, the residue in piece form is calcined at 1150 to 1500° C., and then ground to granules of 1-100 µm in size and vitrified. The purity of the silica glass thus prepared is insufficient for modern applications. The preparation process is complicated and expensive.

WO91/13040 discloses a process in which pyrogenic silicon dioxide is used to prepare silica glass. The process comprises the provision of an aqueous dispersion of pyrogenic silicon dioxide with a solids content of about 5 to about 55% by weight; the conversion of the aqueous dispersion to porous particles by drying the aqueous solution in an oven at a temperature between about 100 and about 200° C. and comminuting the dried porous particles; and then sintering the porous particles in an atmosphere with a partial water pressure in the range of 0.2 to 0.8 atmosphere at temperatures below about 1200° C. High-purity silica glass granules with a diameter of about 3 to 1000 µm, a nitrogen BET surface area of less than about 1 $m^2/g$ and a total impurity content of less than about 50 ppm and a content of metal impurity of less than 15 ppm are obtained. WO91/13040 gives no indications as to how a silica glass granule with defined, narrow dimensions can be obtained.

EP-A-1717202 discloses a process for preparing silica glass granule by sintering a pyrogenic silicon dioxide which has been compacted by a particular process to tamped densities of 150 to 800 g/l. This process, disclosed in DE-A-19601415, is a spray-drying of silicon dioxide dispersed in water and subsequent heat treatment at 150 to 1100° C. The granule thus obtained can be sintered, but does not afford entirely bubble-free silica glass granules.

EP-A-1258456 discloses a process for preparing a monolithic shaped glass body, in which a silicon alkoxide is hydrolysed and then a pyrogenic silicon dioxide powder is added to form a sol, the sol is subsequently converted to a gel, and the gel is dried and subsequently sintered.

EP-A-1283195 likewise discloses sol-gel processes in which silicon alkoxides and pyrogenic silicon dioxide powders are used.

In principle, all processes known in the prior art follow the scheme that a silicon alkoxide is first hydrolysed to give a silicon dioxide powder with formation of a sol, which is converted to a gel, and the gel is subsequently dried and then sintered. The process comprises several stages, and is laborious, sensitive to process variations and prone to contaminations.

BRIEF SUMMARY OF THE INVENTION

It was an object of the present invention to provide a silica glass granule which, as well as a high purity, has a narrow distribution of the granule dimensions and is very substantially free of enclosed bubbles.

It was a further object of the present invention to provide a process for preparing a silica glass granule in which no binders are required. The process should allow the preparation of large amounts and provide products with a high purity and a low level of defects.

BRIEF DESCRIPTION OF THE SEVERAL VIEWS OF THE DRAWINGS

FIG. 1A: A scanning electron micrograph of the silica glass granule from Example 1. The granule grains are very substantially free of sharp (crushing) edges and the elevations are clearly discernible on the surface of the granule grain.

FIG. 1B: A scanning electron micrograph of commercially available silica glass granules. In contrast with FIG. 1A, the commercially available silica glass granules have sharp (crushing) edges and a smooth surface.

DETAILED DESCRIPTION OF THE INVENTION

The invention provides a silica glass granule which has the following features:
Area: 100 to 5000 µm$^2$,
ECD: 5 to 100 µm,
Circumference: 20 to 400 µm,
Maximum diameter: 10 to 140 µm,
Minimum diameter: 5 to 80 µm,
where all values are medium values,
Specific BET surface area: <1 m$^2$/g
Impurities: <50 ppm The BET surface area is determined to DIN 66131. The granule dimensions: area; ECD; circumference; maximum diameter; and minimum diameter, are determined by image analysis by means of a Hitachi H 7500 SEM instrument and an SIS MegaView II CCD camera. The image magnification for the evaluation is 30000:1 with a pixel density of 3.2 nm. The number of particles evaluated is greater than 100. The preparation is effected to ASTM3849-89. The lower threshold limit in relation to detection is at 50 pixels.

In a preferred embodiment, the inventive silica glass granules may have
an area of 500 to 1500 µm$^2$,
an ECD of 10 to 50 µm,
a circumference of 50 to 150 µm,
a maximum diameter of 30 to 70 µm and
a minimum diameter of 20 to 50 µm.

Moreover, the inventive silica glass granule may have a bimodal distribution of the granule grains. The bimodal distribution can be determined, for example, by screen analysis.

The bimodal distribution may have a first maximum at 100 to 200 µm and a second maximum at 250 to 400 µm.

It has been found that an inventive silica glass granule which has a bimodal distribution also has particularly favourable glass properties, such as minimal bubble formation.

Moreover, an advantageous silica glass granule may be one in which the surface of a granule grain has elevations which have irregular spacings from one another.

The elevations may reach a height of 0.5 µm to 35 µm. In general, the heights are 0.3 to 20 µm.

The sum of the impurities in the inventive silica glass granule is <50 ppm. The sum of the impurities may preferably be less than 10 ppm and more preferably less than 5 ppm. The proportion of metallic impurities may preferably be <5 ppm and more preferably <1 ppm.

Preference may further be given to a silica glass granule which has the following contents of impurities, all in ppb: Al≦600, Ca≦300, Cr≦250, Cu≦10, Fe≦800, K≦80, Li≦10, Mg≦20, Mn≦20, Na≦80, Ni≦800, Ti≦200, V≦5 and Zr≦80. Particular preference may be given to a granule which has the following contents of impurities, all in ppb: Al≦350, Ca≦90, Cr≦40, Cu≦3, Fe≦100, K≦50, Li≦1, Mg≦10, Mn≦5, Na≦50, Ni≦80, Ti≦100, V≦1, Zr≦3.

To determine the metal content, the silica glass granule is dissolved in a solution containing hydrofluoric acid. The silicon tetrafluoride which forms evaporates and the remaining residue is analysed by means of inductively coupled plasma mass spectrometry (ICP-MS). The accuracy is approx. 10%.

The invention further provides a process for preparing the silica glass granule, in which
a) pyrogenic silicon dioxide powder with a tamped density of 15 to 190 g/l is compacted to slugs,
b) these are subsequently crushed and the slug fragments with a diameter of <100 µm and >800 µm are removed,
c) the slug fragments having a tamped density of 300 to 600 g/l, and
d) these are subsequently treated at 600 to 1100° C. in an atmosphere which comprises one or more compounds which are suitable for removing hydroxyl groups, and
e) then sintered at 1200° C. to 1400° C.

Slugs refer to the more or less strip-like intermediates which are formed in the roller compaction by the pressing of the starting material. They are crushed in a second step. The properties of the slugs and slug fragments can be influenced by the process parameters, such as the selected process control mode, the compacting force, the width of the gap between the two rollers and the pressure hold time which is established by the appropriate change in the rotational speeds of the pressing rollers.

The pyrogenic silicon dioxide powder used may be one having a primary particle size of 5 to 50 nm and a BET surface area of 30 to 400 m$^2$/g. Preferably, pyrogenic silicon dioxide having a BET surface area of 40 to 150 m$^2$/g can be used. The purity of the pyrogenic silicon dioxide powder used is at least 99% by weight and preferably at least 99.9% by weight.

The pyrogenic silicon dioxide powder may have a tamped density (to DIN EN ISO 787-11) of 15 to 190 g/l, preferably of 30 to 150 g/l. It can be precompacted by means of suitable processes and apparatus. For example, the apparatus according to U.S. Pat. No. 4,325,686, U.S. Pat. No. 4,877,595, U.S. Pat. No. 3,838,785, U.S. Pat. No. 3,742,566, U.S. Pat. No. 3,762,851, U.S. Pat. No. 3,860,682 can be used. In a preferred embodiment of the invention, a pyrogenic silicon dioxide powder which has been compacted by means of a pressing belt filter according to EP-A-0280851 or U.S. Pat. No. 4,877,595, can be used.

The pyrogenic silicon dioxide powder having a tamped density of 15 to 190 g/l is subsequently compacted to slugs. Compaction is understood to mean mechanical compression without addition of binder. The compaction should ensure uniform pressing of the pyrogenic silicon dioxide powder in order to obtain slugs with a very substantially homogeneous density.

The compaction to slugs can be effected by means of two rollers, of which one or else both may simultaneously have a venting function.

Preferably, two compacting rollers can be used, which may be smooth or profiled. The profile may be present either only on one compacting roller or on both compacting rollers. The profile may consist of axially parallel corrugations or of any arrangement of recesses (depressions) in any configuration. In a further embodiment of the invention, at least one of the rollers may be a vacuum roller.

For the compaction, a suitable process is especially one in which the pyrogenic silicon dioxide powder to be compacted is compacted by means of two compression rollers, one of which is arranged so as to be driveable with rotation, and which bring out specific pressures of 0.5 kN/cm to 50 kN/cm, the surface of the compacting rollers consisting of a material which is predominantly or entirely free of metals and/or metal compounds, or the surface consisting of a very hard material. Suitable materials are industrial ceramics, for example silicon carbide, silicon nitride, coated metals or aluminium oxide. The process is suitable for minimizing contamination of the slug fragments and of the silica glass granule.

After the compaction, the slugs are crushed. To this end, a screen granulator which, with its mesh width, determines the particle size is used. The mesh width may be 250 µm to 20 mm.

For the crushing of the slugs, an apparatus with two contrarotatory rollers with a defined gap or a spiked roller may be used.

The slug fragments can be classified by means of a sifter, a screen or a classifier. The fines fraction (particles smaller than 100 μm) can be removed. The sifters used may be crossflow sifters, countercurrent deflection sifters, etc. The classifier used may be a cyclone. The fines fraction removed in the classification (particles smaller than 100 μm) can be recycled into the process according to the invention.

The slug fragments have a tamped density of 300 to 600 g/l. The slug fragments preferably have a tamped density of 350 to 550 g/l and more preferably 400 to 600 g/l. The slug fragments generally have a tamped density 10 to 40% higher than the uncrushed slugs.

The classified slug fragments are subsequently exposed at temperatures of 400 to 1100° C. to an atmosphere which comprises one or more reactive compounds which are suitable for removing hydroxyl groups and impurities from the slug fragments. These may preferably be chlorine, hydrochloric acid, sulphur halides and/or sulphur oxide halides. More preferably, chlorine, hydrochloric acid, disulphur dichloride or thionyl chloride may be used.

Usually, the reactive conditions are used in combination with air, oxygen, helium, nitrogen, argon and/or carbon dioxide. The proportion of the reactive compounds may be 0.5 to 20% by volume.

Subsequently, sintering is effected at 1200° C. to 1400° C.

EXAMPLES 1-3

The Examples are carried out according to the following procedure. Feedstocks, reaction conditions and apparatus settings are reproduced in Table 1.

The silicon dioxide powder is compacted in the compactor. The rod-shaped slugs obtained are crushed by means of a comminuting machine (Frewitt MG-633) equipped with a screen fabric (size 800 μm). After the fines removal, stable slug fragments are obtained. Subsequently, the slug fragments are purified in an HCl gas stream in a reactor and then sintered.

In each case, a high-purity, virtually bubble-free silica glass granule is obtained with the dimensions and impurities listed in Table 1.

The inventive silica glass granule of Examples 1 and 2 exhibits a bimodal distribution of the granule grains. For the granule for Example 1, the values determined by means of screen fractionation (mesh width 0.8 mm) in Table 2 are found. In contrast, commercially available silica glass granules exhibit a monomodal distribution.

TABLE 2

| Screen fractionation of Example 1 | |
|---|---|
| Particle size [μm] | Residue [%] |
| 100-125 | 0.8 |
| 125-160 | 2.7 |
| 160-200 | 42.9 |
| 200-315 | 13.6 |
| 315-355 | 15.6 |
| 355-400 | 24.4 |

FIG. 1A shows a scanning electron micrograph of the silica glass granule from Example 1. It is found that the granule grains are very substantially free of sharp (crushing) edges. Moreover, the elevations are clearly discernible on the surface of the granule grain. In contrast, FIG. 1B, shows a scanning electron micrograph of commercially available silica glass granules, which have sharp (crushing) edges and a smooth surface.

The inventive silica glass granule has a high purity and a narrow distribution of the granule dimensions, and is very substantially free of enclosed bubbles.

TABLE 1

| Feedstocks, reaction conditions and apparatus settings | | | | |
|---|---|---|---|---|
| Example | | 1 | 2 | 3* |
| SiO₂ used | | | | — |
| BET surface area | m²/g | 58 | 93 | — |
| Tamped density | g/l | 68 | 48 | — |
| Compactor¹ | | | | |
| Pressing force | kN | 50-65 | 20-25 | — |
| Roller speed | min | 5 | 3 | — |
| Screw speed | min | 25 | 18 | — |
| Slugs/fragments | | | | |
| Tamped density | | | | |
| Slugs² | g/l | 380 | 330 | — |
| Slug fragments³ | g/l | 520 | 410 | |
| Purification (HCl) | | | | |
| Temperature | °C. | 820 | 860 | — |
| Time | min | 60 | 30 | |
| Silica glass granule | | | | |
| Sintering temperature | °C. | 1320 | 1300 | — |
| BET surface area | m²/g | <1 | <1 | <1 |
| Dimensions | | | | |
| Area | nm² | 748 | 1448 | 8905 |
| ECD | nm | 31 | 47 | 106 |
| Circumference | nm | 105 | 135 | 382 |
| Maximum diameter | nm | 43 | 68 | 141 |
| Minimum diameter | nm | 28 | 46 | 91 |
| Impurities | | | | |
| Li | ppb | <10 | <10 | — |
| B | ppb | 28 | 25 | — |
| Na | ppb | 50 | <10 | — |
| Mg | ppb | 37 | 11 | — |
| Al | ppb | 190 | 90 | — |
| Ca | ppb | 90 | 75 | — |
| Ti | ppb | 60 | 40 | — |
| Cr | ppb | 33 | 24 | — |
| Mn | ppb | <10 | <10 | — |
| Fe | ppb | 110 | 45 | — |
| Ni | ppb | 57 | <10 | — |
| Cu | ppb | <10 | <10 | — |
| Zr | ppb | 14 | 23 | — |
| K | ppb | 40 | <10 | — |
| Silanol group content | ppm | 28 | 21 | |

[1]Compactor: L 200/50 P, from Hosokawa BEPEX GmbH; working width: 50 mm; with preliminary venting; equipped with a 12 mm stainless steel roller which has a wavy profile and is closed at the side;
[2]before classification;
[3]after classification

The invention claimed is:

1. A process for preparing a silica glass granule, the process comprising:
    a) mechanically compacting pyrogenic silicon dioxide powder having a tamped density of 15 to 190g/l, to obtain slugs;
    b) crushing the slugs, to obtain slug fragments having a tamped density of 300 to 600g/l;
    c) removing the slug fragments having a diameter of <100 μm and >800 μm, to obtain classified fragments;
    d) heating the classified fragments at a temperature in a range from 600 to 1100° C. in an atmosphere comprising a compound which removes hydroxyl groups, to obtain treated fragments; and
    e) sintering the treated fragments at a temperature in range from 1200° C. to 1400° C., to obtain silica glass granules having:

a median area in a range from 100 to 5000 μm²;
a median ECD in a range from 5 to 100 μm,
a median circumference in a range from 20 to 400 μm;
a median maximum diameter in a range from 10 to 140 μm.
a median minimum diameter in a range from 5 to 80 μm,
a specific BET surface area of <1 m²/g; and
a total impurity content of <50 ppm.

2. The process of claim 1, wherein the pyrogenic silicon dioxide powder has a tamped density of 30 to 150 g/l.

3. The process of claim 1, wherein the slug fragments have a tamped density of 400 to 500g/l.

4. The process of claim 1, wherein the compound, during (d), is at least one selected from the group consisting of chlorine, hydrochloric acid, a sulphur halide, and a sulphur oxide halide.

5. The process of claim 4, wherein the compound, during (d), is hydrochloric acid.

6. The process of claim 4, wherein the compound, during (d), is a sulphur halide.

7. The process of claim 6, wherein the compound, during (d), is disulphur dichloride.

8. The process of claim 4, wherein, during (d), a content of the compound in the atmosphere is in a range from 0.5 to 20% by volume.

9. The process of claim 1, wherein the silica glass granule has a bimodal distribution.

10. The process of claim 9, wherein the bimodal distribution has a first maximum at 100 to 200 μm and a second maximum at 250 to 450 μm.

11. The process of claim 1, wherein a surface of a silica granule grain has elevations with irregular spacings.

12. The process of to claim 11, wherein a height of the elevations is in a range from 0.5 μm to 35 μm.

13. The process of claim 1, wherein the silica glass granule has a median area in a range from 500 to 1500 μm median ECD in a range from 10 to 50 μm, a median circumference in a range from 50 to 150 μm, a median maximum diameter in a range from 30 to 70 μm, and a median minimum diameter in a range from 20 to 50 μm.

14. The process of claim 13, wherein the silica glass granule has a bimodal distribution with a first maximum at 100 to 200 μM and a second maximum at 250 to 450 μm.

15. The process of claim 13, wherein a surface of a silica granule grain has elevations with irregular spacings and a height of the elevations is in a range from 0.5 μm to 35 μm.

16. The process of claim 15, wherein the compound, during (d), is hydrochloric acid.

17. The process of claim 13, wherein the compound, during (d), is at least one selected from the group consisting of chlorine, hydrochloric acid, a sulphur halide, and a sulphur oxide halide.

18. The process of claim 13, wherein the compound, during (d), is chlorine.

19. The process of claim 13, wherein the compound, during (d), is a sulphur halide.

20. The process of claim 13, wherein the compound, during (d), is disulphur dichloride.

* * * * *